(12) United States Patent
Koda

(10) Patent No.: US 10,151,509 B2
(45) Date of Patent: Dec. 11, 2018

(54) WATER HEATER

(71) Applicant: NORITZ CORPORATION, Hyogo (JP)

(72) Inventor: Hidefumi Koda, Fountain Valley, CA (US)

(73) Assignee: NORITZ CORPORATION, Hyogo (JP)

( * ) Notice: Subject to any disclaimer, the term of this patent is extended or adjusted under 35 U.S.C. 154(b) by 162 days.

(21) Appl. No.: 14/750,996

(22) Filed: Jun. 25, 2015

(65) Prior Publication Data

US 2016/0025375 A1 Jan. 28, 2016

(30) Foreign Application Priority Data

Jul. 25, 2014 (JP) ................... 2014-151717

(51) Int. Cl.
*F24H 8/00* (2006.01)
*F24H 1/16* (2006.01)

(52) U.S. Cl.
CPC .............. *F24H 8/006* (2013.01); *F24H 1/165* (2013.01); *Y02B 30/106* (2013.01)

(58) Field of Classification Search
CPC ... F24H 8/00; F24H 8/006; F24H 9/00; F24H 9/16; F24H 1/14; F24H 1/145;
(Continued)

(56) References Cited

U.S. PATENT DOCUMENTS 4,543,892 A * 10/1985 Tomlinson ........... B01D 53/507
110/203

5,704,343 A * 1/1998 Ahn ..................... F24H 8/006
126/110 R
(Continued)

FOREIGN PATENT DOCUMENTS

| JP | 2009-172535 A | 8/2009 |
|---|---|---|
| JP | 2011-163569 A | 8/2011 |
| JP | 5367603 B2 | 12/2013 |

OTHER PUBLICATIONS

Decision to Grant Patent; issued by the Japanese Patent Office dated Oct. 27, 2015, which corresponds to Japanese Patent Application No. 2014-151717 and is related to U.S. Appl. No. 141/50,996; with English language translation.

*Primary Examiner* — Steven B McAllister
*Assistant Examiner* — Benjamin W Johnson
(74) *Attorney, Agent, or Firm* — Studebaker & Brakett PC

(57) ABSTRACT

A water heater of a latent heat recovery type adapted to an exhaust suction system includes a drainage water discharge path. The drainage water discharge path includes a drainage water tank having a water-seal mechanism, and the drainage water tank has a first chamber and a second chamber communicating with the first chamber through a hole. The second chamber is capable of storing drainage water up to a storage water plane located at a position higher than an upper end of the hole, and the first chamber senses a fluid level in the first chamber reaching a prescribed sensing plane. A height difference between the sensing plane in the first chamber and the storage water plane is greater than a height of a water head obtained by converting a difference between atmospheric pressure and a minimum pressure at the drainage water inlet to the water head.

11 Claims, 6 Drawing Sheets

(58) Field of Classification Search
CPC ........ F24H 1/165; F23L 17/005; F22B 15/00; F23D 14/045; F23D 14/586; Y02B 30/106
USPC .... 122/13.3, 18.1, 18.3, 18.31, 18.4; 62/150
See application file for complete search history.

(56) References Cited

U.S. PATENT DOCUMENTS

| | | | |
|---|---|---|---|
| 5,950,573 A * | 9/1999 | Shellenberger | F23D 14/82 122/18.31 |
| 2006/0277690 A1* | 12/2006 | Pyo | D06F 25/00 8/149.2 |
| 2011/0174289 A1* | 7/2011 | Paller | F24H 3/087 126/110 R |
| 2013/0025546 A1* | 1/2013 | Okamoto | F24H 8/00 122/14.21 |
| 2013/0312671 A1* | 11/2013 | Deivasigamani | G06F 17/30902 122/1 C |

* cited by examiner

WATER HEATER

BACKGROUND OF THE INVENTION

Field of the Invention

The present invention relates to a water heater, and particularly to a water heater of a latent heat recovery type capable of heating water by recovering latent heat of combustion gas.

Description of the Background Art

A water heater of a latent heat recovery type includes a secondary heat exchanger recovering mainly latent heat in addition to a primary heat exchanger recovering mainly sensible heat of combustion gas, and can obtain heat of condensation (latent heat) by condensing vapor contained in combustion gas. Thus, the water heater of the latent heat recovery type can achieve high heat exchange efficiency.

In such a water heater of the latent heat recovery type, drainage water (condensate) resulting from condensation of vapor in combustion gas within the secondary heat exchanger is generated. Here, combustion gas contains a nitrogen oxide generated as a result of reaction between nitrogen and oxygen in air caused by combustion or a sulfur oxide generated as a result of reaction between a sulfur component in fuel and oxygen caused by combustion. Thus, generated drainage water exhibits strong acidity owing to such a nitrogen oxide or sulfur oxide.

Drainage water generated in the secondary heat exchanger is normally discharged to the outside through a drainage water discharge path after it is neutralized by a neutralizer disposed in the drainage water discharge path. In the water heater including such a drainage water discharge path, a flow path for combustion gas and the drainage water discharge path communicate with each other.

Therefore, in a case of the water heater of the latent heat recovery type adapted to an exhaust suction system which suctions combustion gas and emits combustion gas to the outside, a fan is placed downstream of the secondary heat exchanger. Therefore, a pressure in the secondary heat exchanger becomes negative due to a fan suction pressure, outside air flows back into the secondary heat exchanger through the drainage water discharge path, and discharge of drainage water from the secondary heat exchanger may become difficult.

Then, in such a water heater, an approach for solving the problem above, for example, by providing a plurality of chambers in a drainage water tank provided in the drainage water discharge path and filling a hole allowing communication between the chambers with drainage water to thereby establish water seal has been adopted. A water-seal structure of a drainage water tank in such a water heater of a latent heat recovery type is disclosed, for example, in Japanese Patent Laid-Open Publication No. 2009-172535 and Japanese Patent No. 5367603.

In a water heater of a latent heat recovery type including a drainage water tank having a water-seal mechanism as described above, measures have been taken against clogging of the drainage water discharge path. Specifically, measures such as a sensing member sensing rise of a fluid level in the drainage water tank is provided around a top portion of an internal space in the drainage water tank so as to sense rise of a fluid level in the drainage water tank due to clogging of the drainage water tank, and the water heater is stopped when it is the case. In a water heater of an exhaust suction type including a drainage water tank having a water-seal structure, however, in spite of absence of clogging of the drainage water tank or a drainage water discharge portion, a fluid level in the drainage water tank tends to rise due to a fan suction pressure, and such a defective condition as erroneous sensing by a sensing member and resultant stop of the water heater may be caused.

SUMMARY OF THE INVENTION

The present invention was made in view of the above-described problems, and an object thereof is to prevent erroneous sensing by a sensing member sensing rise of a fluid level in a drainage water tank resulting from clogging of the drainage water tank in a water heater of a latent heat recovery type adapted to an exhaust suction system which includes a drainage water tank having a water-seal mechanism.

A water heater according to the present invention is a water heater of a latent heat recovery type, capable of heating water by recovering latent heat of combustion gas, and includes a burner generating combustion gas, a heat exchanger heating water which flows through the inside, through heat exchange with combustion gas generated in the burner, a fan suctioning combustion gas which has passed through the heat exchanger and emitting combustion gas to the outside of the water heater, and a drainage water discharge path connected to the heat exchanger for discharging drainage water generated as a result of recovery of latent heat in the heat exchanger to the outside of the heat exchanger. Thus, the water heater according to the present invention is of an exhaust suction type.

The drainage water discharge path includes a drainage water tank having a water-seal mechanism. Namely, the drainage water tank has a first chamber provided with a drainage water inlet for allowing drainage water to flow in and a second chamber partitioned by a partition from the first chamber, communicating with the first chamber through a hole, and provided with a drainage water discharge port for discharging drainage water. The second chamber has a drainage water storage portion capable of storing drainage water which has flowed into the second chamber through the hole up to a storage water plane located at a position higher than an upper end of the hole. The first chamber has a sensing member sensing a fluid level in the first chamber reaching a sensing plane higher by a prescribed height than the storage water plane.

The water heater according to the present invention is characterized in that a height difference between the sensing plane in the first chamber and the storage water plane is greater than a height of a water head obtained by converting a difference between atmospheric pressure and a minimum pressure at the drainage water inlet to the water head. Thus, in the water heater of the latent heat recovery type adapted to the exhaust suction system which includes the drainage water tank having the water-seal mechanism, erroneous sensing by the sensing member sensing rise of a fluid level in the drainage water tank can be prevented.

Preferably, the height difference between the sensing plane in the first chamber and the storage water plane is greater than a height of a water head obtained by converting a difference between atmospheric pressure and a minimum pressure in an exhaust path for combustion gas from the heat exchanger to the fan to the water head. Thus, erroneous sensing by the sensing member can more reliably be prevented.

In the water heater according to the present invention, preferably, a volume of a portion from a height position of the upper end of the hole in the second chamber to the storage water plane is greater than a volume of a portion from the storage water plane in the first chamber to the sensing plane. More preferably, a volume of the portion from the height position of the upper end of the hole in the second chamber to the storage water plane is 1.5 to 5 times as great as a volume of the portion from the storage water plane in the first chamber to the sensing plane. Thus, lowering of the fluid level from the height position of an upper end of a hole and resultant loss of water-seal of a drainage water tank at the time when the fluid level of drainage water is raised in a first chamber due to a suction pressure of a fan at the time of resumption of operation of fan can be suppressed.

In the second chamber of the water heater according to the present invention, preferably, a cross-sectional area in a horizontal direction of an upper space adjacent to an upper side of the drainage water storage portion is greater than a cross-sectional area in the horizontal direction of the drainage water storage portion. More preferably, a cross-sectional area in the horizontal direction of the upper space adjacent to the upper side of the drainage water storage portion is 1.2 to 2 times as great as a cross-sectional area in the horizontal direction of the drainage water storage portion. Thus, significant rise of a fluid level above the storage water plane in the second chamber at the time when the fluid level of drainage water which has been raised by the suction pressure of the fan in the first chamber lowers to the storage water plane when the water heater (fan) is stopped can be suppressed and such a defective condition that drainage water scatters due to abrupt discharge of drainage water can be suppressed.

In the water heater according to the present invention, preferably, the second chamber has an air vent for communicating with atmosphere and the air vent communicates with the outside of the water heater through an air tube. With the air vent, drainage water can smoothly be discharged through the drainage water discharge port in the second chamber. In a case that the air vent communicates with the inside of the water heater, after the drainage water tank is water-sealed, dust or foreign matters may be suctioned into the drainage water tank through the drainage water discharge port due to a negative pressure in the water heater. As the air vent communicates with the outside of the water heater through the air tube, however, suction of dust or foreign matters through the drainage water discharge port can be suppressed.

The water heater according to the present invention preferably further includes an air passage pipe communicating with an exhaust path for combustion gas from the heat exchanger to the fan and the drainage water discharge path from the heat exchanger to the drainage water tank. Thus, since air which enters the inside of the water heater from the outside during a period until the drainage water tank is water-sealed is diverted to both of the drainage water discharge path and the air passage pipe, an amount of air which flows into the heat exchanger through the drainage water discharge path can be decreased as compared with a case that air is taken into the heat exchanger from the outside only through the drainage water discharge path. Thus, discharge of drainage water through the drainage water discharge path is facilitated and drainage water is less likely to stay in the heat exchanger.

As described above, according to the present invention, erroneous sensing by a sensing member sensing rise of a fluid level in a drainage water tank resulting from clogging of the drainage water tank in a water heater of a latent heat recovery type adapted to an exhaust suction system which includes a drainage water tank having a water-seal mechanism can be prevented.

DESCRIPTION OF THE PREFERRED EMBODIMENTS

Figure 1:
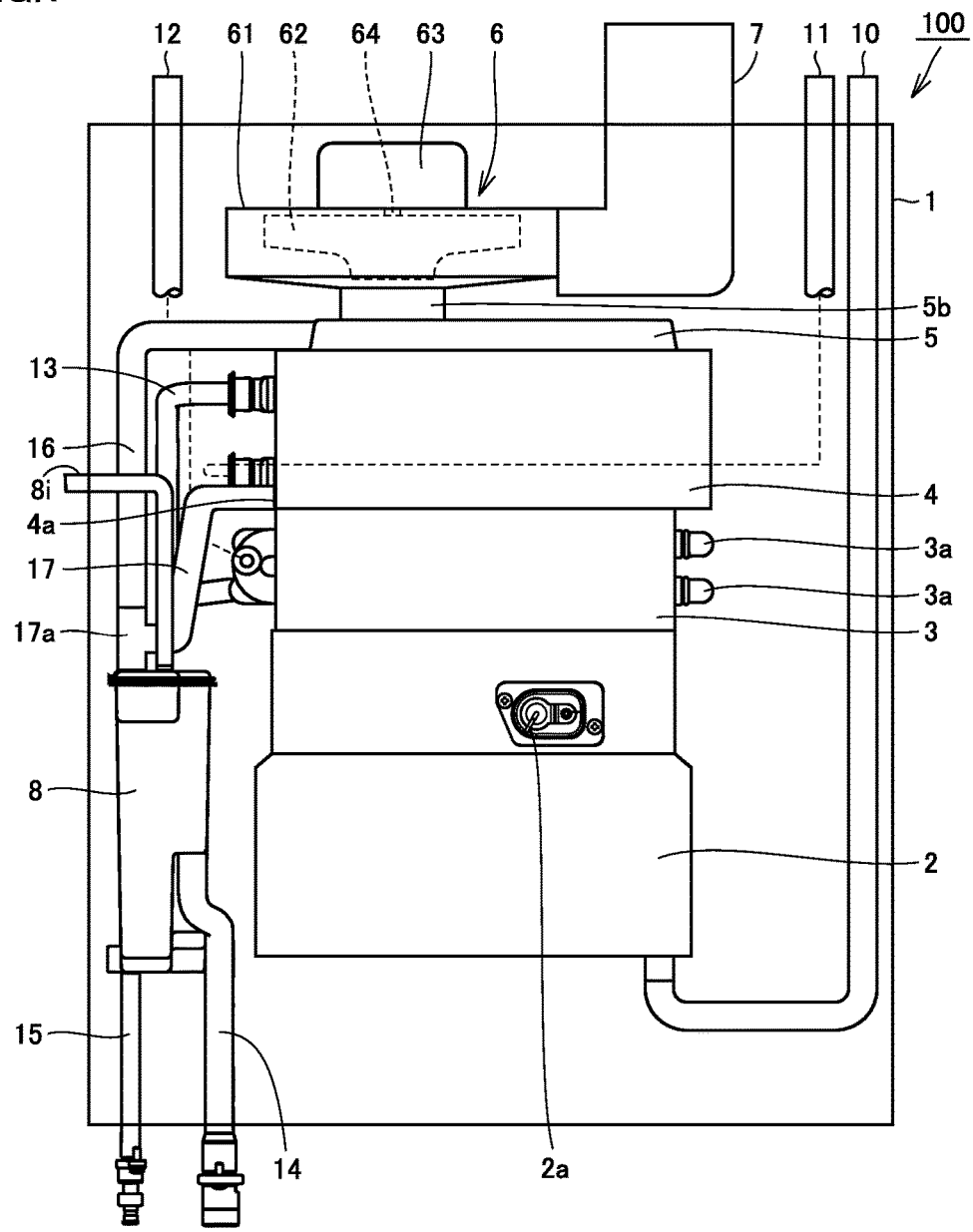
FIG. 1 is a front view schematically showing a construction of a water heater in a first embodiment.

An embodiment of the present invention will be described hereinafter with reference to drawings. In the drawings, the same or corresponding elements have the same reference characters allotted. Relation of such a dimension as a length, a width, a thickness, or a depth is modified as appropriate for clarity and brevity of the drawings and does not represent actual dimensional relation.

First Embodiment

A construction of a water heater in one embodiment of the present invention will be described with reference to FIGS. 1 to 5.

Figure 2:
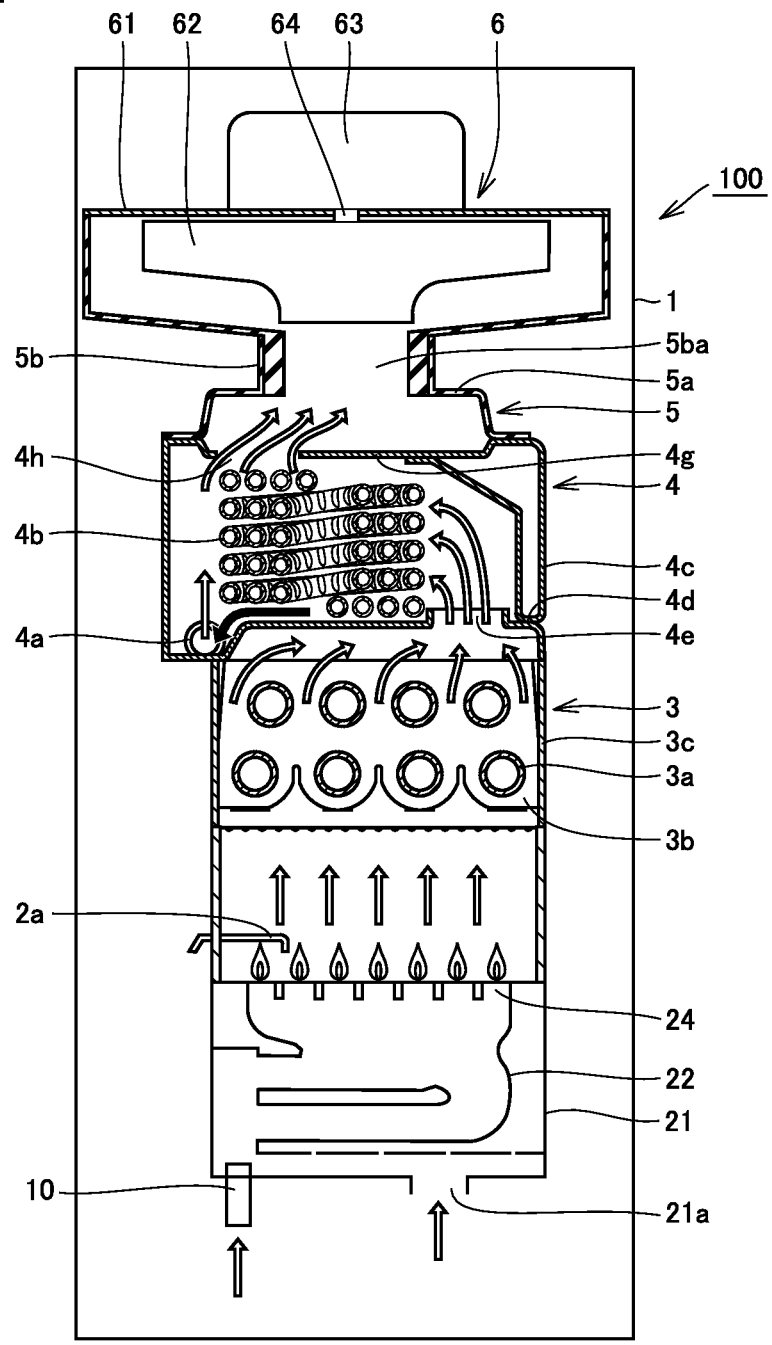
FIG. 2 is a partial cross-sectional side view schematically showing the construction of the water heater shown in FIG. 1.

Initially, referring mainly to FIGS. 1 and 2, a water heater 100 in the present embodiment is of a latent heat recovery type adapted to an exhaust suction and combustion system. This water heater 100 mainly has a housing 1, a burner 2, a primary heat exchanger 3, a secondary heat exchanger 4, an exhaust box 5, a fan 6, an exhaust tube 7, a drainage water tank 8, and pipes 10 to 17. Since water heater 100 in the present embodiment is of an exhaust suction and combustion type, burner 2, primary heat exchanger 3, secondary heat exchanger 4, and fan 6 are arranged in this order from an upstream side to a downstream side in a flow of combustion gas.

(Burner)

Referring mainly to FIGS. 1 and 2, burner 2 is an apparatus for generating combustion gas by burning fuel gas, and includes combustion tubes 22 having a plurality of burner port portions 24. A gas supply pipe 10 is connected to combustion tubes 22. This gas supply pipe 10 serves to supply fuel gas to combustion tubes 22. For example, an electromagnetic valve and a proportional valve (neither of which is shown) are attached to this gas supply pipe 10. Burner 2 is also supplied with air through an opening 21a in a bottom portion of a burner case 21 accommodating combustion tubes 22.

A spark plug 2a is arranged above combustion tubes 22. This spark plug 2a serves to ignite an air fuel mixture injected from burner port portion 24 of combustion tube 22 by generating sparks between the plug and a target (not shown) provided in combustion tube 22, as an ignition apparatus (an igniter) is activated. Burner 2 generates a quantity of heat by burning fuel gas supplied through gas supply pipe 10 (which is called a combustion operation).

(Primary Heat Exchanger)

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, serves to heat water which flows through heat conduction pipe 3a of primary heat exchanger 3 with the quantity of heat generated as a result of the combustion operation of burner 2.

(Secondary Heat Exchanger)

Referring mainly to FIG. 2, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 100 according to the present embodiment thus has secondary heat exchanger 4 of a latent heat recovery type, it is a water heater of the latent heat recovery type.

Secondary heat exchanger 4 mainly has a drainage water lead-out port 4a, a heat conduction pipes 4b, a sidewall 4c, a bottom wall 4d, and an upper wall 4g. Heat conduction pipes 4b is layered as it is spirally wound. Sidewall 4c, bottom wall 4d, and upper wall 4g are arranged to surround heat conduction pipes 4b.

In secondary heat exchanger 4, water flowing through heat conduction pipes 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, thereby producing drainage water.

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipes 4b of secondary heat exchanger 4 is arranged.

As shown with hollow arrows in FIG. 2, combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Upper wall 4g is provided with an opening 4h. This opening 4h allows communication between the space where heat conduction pipes 4b of secondary heat exchanger 4 is arranged and an internal space in exhaust box 5. As shown with hollow arrows in FIG. 2, combustion gas can flow from secondary heat exchanger 4 into the internal space in exhaust box 5 through opening 4h.

Drainage water lead-out port 4a is provided in sidewall 4c or bottom wall 4d. This drainage water lead-out port 4a opens at a lowest position in the space surrounded by sidewall 4c, bottom wall 4d and upper wall 4g (at a lowermost position in a vertical direction in the state where the water heater is placed), which is lower than a lowermost end portion of heat conduction pipes 4b. Thus, drainage water produced in secondary heat exchanger 4 can be guided to drainage water lead-out port 4a along bottom wall 4d and sidewall 4c as shown with black arrows in FIG. 2.

(Exhaust Box)

Referring mainly to FIG. 2, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. An internal space of box main body 5a communicates through opening 4h of secondary heat exchanger 4 with the internal space in which heat conduction pipes 4b of secondary heat exchanger 4 is arranged. Fan connection portion 5b is provided so as to protrude from an upper portion of box main body 5a. This fan connection portion 5b has a cylindrical shape, for example, and has an internal space 5ba that communicates with the internal space of box main body 5a.

(Fan)

Referring mainly to FIGS. 1 and 2, fan 6 mainly has a fan case 61, an impeller 62, a drive source 63, and a rotation shaft 64. Drive source 63 is provided outside fan case 61 and rotation shaft 64 couples impeller 62 accommodated in fan case 61 and drive source 63 provided outside fan case 61 to each other. Thus, impeller 62 can rotate around rotation shaft 64 as it receives drive force from drive source 63.

Fan 6 is arranged downstream of the heat exchanger (the primary heat exchanger and the secondary heat exchanger) in the direction of flow of combustion gas and constructed to pull air into burner 2. Fan 6 is connected to exhaust tube 7 located outside water heater 100 in order to suction combustion gas which has passed through secondary heat exchanger 4 (of which heat has been exchanged in secondary heat exchanger 4) and to emit combustion gas to the outside of water heater 100. Exhaust tube 7 is arranged outside water heater 100 and connected on an outer circumferential side of fan case 61. Therefore, combustion gas emitted to the outer circumferential side of impeller 62 can be emitted out of water heater 100 through exhaust tube 7.

Fan 6 is thus located downstream of exhaust box 5 and secondary heat exchanger 4 in the flow of combustion gas. Namely, in water heater 100, burner 2, primary heat exchanger 3, secondary heat exchanger 4, exhaust box 5, and fan 6 are arranged in this order from upstream to downstream in the flow of combustion gas produced in burner 2. Since combustion gas is suctioned and exhausted by means of fan 6 as above in this arrangement, water heater 100 in the present embodiment is a water heater of an exhaust suction and combustion type.

(Drainage Water Discharge Path)

Referring mainly to FIG. 1, a drainage water discharge path in water heater 100 in the present embodiment is constituted of drainage water lead-out port 4a, pipe 17, a branch pipe 17a, drainage water tank 8, and drainage water discharge piping 14. Drainage water tank 8 serves to store drainage water produced in secondary heat exchanger 4 and to water-seal the drainage water discharge path.

Figure 3:
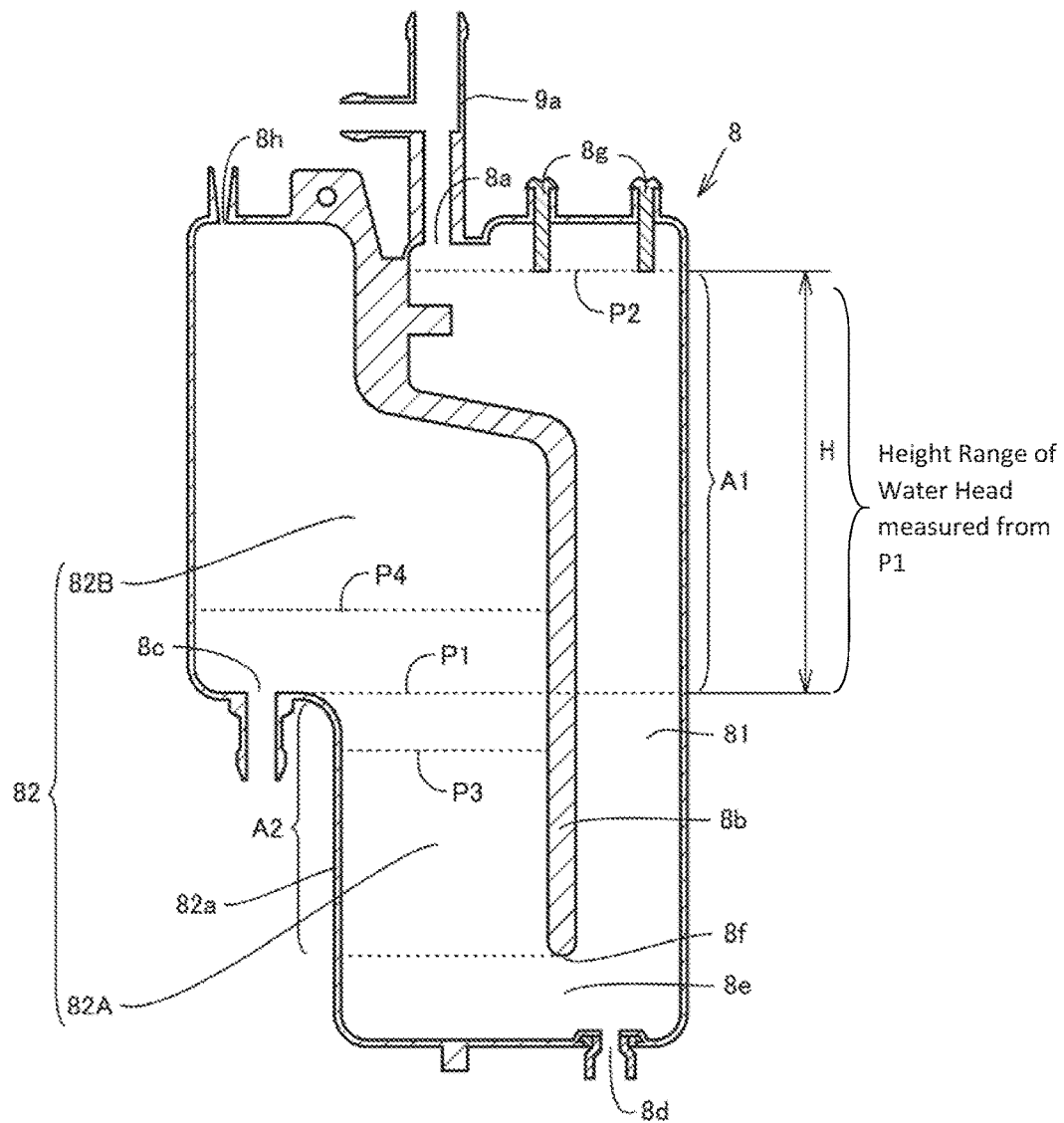
FIG. 3 is a cross-sectional view of a drainage water tank in the water heater in the first embodiment.
Figure 4:
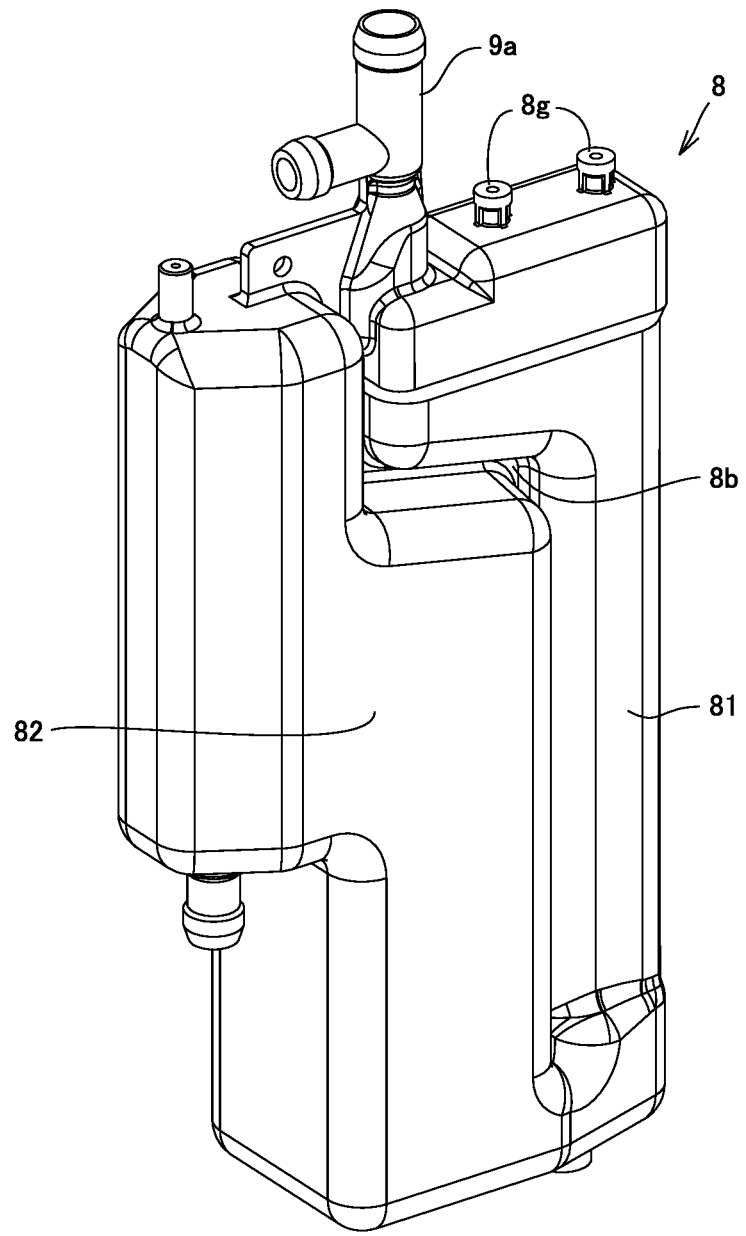
FIG. 4 is a perspective view of the drainage water tank in the water heater in the first embodiment.
Figure 5:
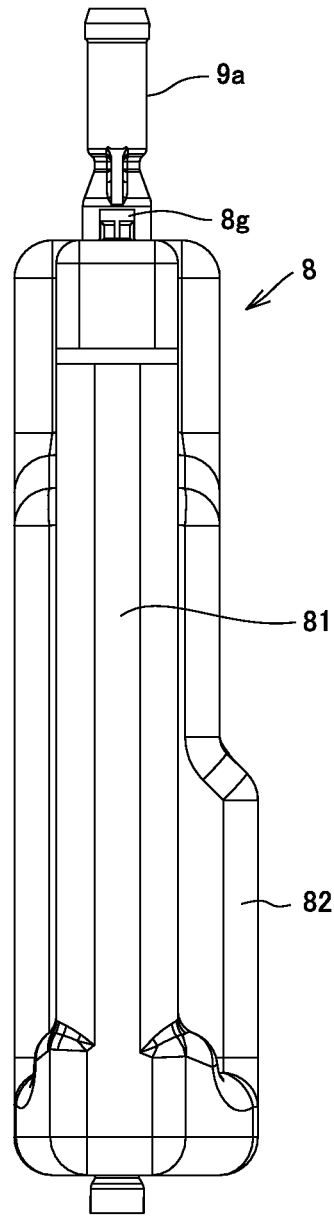
FIG. 5 is a side view of the drainage water tank in the water heater in the first embodiment when viewed from side of a first chamber.

FIGS. 3 to 5 show a cross-sectional view (FIG. 3), a perspective view (FIG. 4), and a side view (FIG. 5) from a side of a first chamber 81, of the drainage water tank in the water heater in the first embodiment, respectively. Referring mainly to FIG. 3, this drainage water tank 8 mainly has a drainage water inlet 8a, a partition 8b, a drainage water discharge port 8c, and a drainage water outlet port 8d.

An internal space in drainage water tank 8 is partitioned into first chamber 81 and a second chamber 82 by partition 8b. First chamber 81 and second chamber 82 communicate with each other through a hole 8e provided under partition 8b. Drainage water inlet 8a is provided on an upper side of first chamber 81 and drainage water discharge port 8c is provided at a prescribed height position in second chamber 82.

In order to discharge drainage water in secondary heat exchanger 4 to the outside, drainage water lead-out port 4a (FIGS. 1 and 2) of secondary heat exchanger 4 and drainage water inlet 8a (FIG. 3) of drainage water tank 8 are connected to each other through pipe 17 and branch pipe 17a (FIG. 1). Drainage water discharge piping 14 is connected to drainage water discharge port 8c (FIG. 3) of drainage water tank 8 and leads to the outside of water heater 100 (FIG. 1). Acid drainage water which has flowed into drainage water tank 8 is temporarily stored in the internal space of drainage water tank 8, and thereafter usually discharged through drainage water discharge piping 14 to the outside of water heater 100.

Water heater 100 in the present embodiment further includes an air passage pipe 16 communicating with an exhaust path for combustion gas from the heat exchanger (secondary heat exchanger 4) to fan 6 and the drainage water discharge path from the heat exchanger (secondary heat exchanger 4) to drainage water tank 8. Specifically, air passage pipe 16 is connected to exhaust box 5 and branch pipe 17a. Thus, during a period until the drainage water tank is water-sealed, some of air which enters the water heater through the drainage water discharge path from the outside of the water heater is diverted to the air passage pipe from the drainage water discharge path. Therefore, as compared with a case that air is taken into the heat exchanger from the outside only through the drainage water discharge path, an amount of air which flows into the heat exchanger through the drainage water discharge path can be decreased. Therefore, discharge of drainage water from the heat exchanger through the drainage water discharge path is facilitated and drainage water is less likely to stay in the heat exchanger.

In the present embodiment, drainage water tank 8 has a water-seal structure. Namely, second chamber 82 has a drainage water storage portion 82A capable of storing drainage water which has flowed into second chamber 82 through hole 8e provided in partition 8b up to a storage water plane P1 located at a position higher than upper end 8f of hole 8e. According to such a structure, when drainage water flows into first chamber 81 through drainage water inlet 8a and a fluid level of drainage water stored in a lower portion of first chamber 81 and a lower portion of drainage water storage portion 82A in second chamber 82 is higher than upper end 8f of hole 8e, outside air (air outside water heater 100) which has entered drainage water tank 8 through drainage water discharge port 8c can be prevented from going toward drainage water inlet 8a. Therefore, entry of outside air into water heater 100 through drainage water tank 8 can be prevented. Waterline plane P1 refers to a plane corresponding to a fluid level on each of opposing sides of partition 8b in drainage water tank 8 at the time when fan 6 of water heater 100 does not operate (a suction pressure is not generated), and to a horizontal plane located at a lowermost position of an upper end of a sidewall 82a other than partition 8b of drainage water storage portion 82A in second chamber 82.

First chamber 81 has a sensing member 8g sensing a fluid level in first chamber 81 reaching a sensing plane P2 higher by a prescribed height than storage water plane P1. Though sensing member 8g is not particularly limited so long as it is a member capable of sensing a fluid level reaching prescribed sensing plane P2, for example, a sensing electrode or various known sensors can be employed. By placing sensing member 8g at a position higher by a prescribed height than storage water plane P1, rise of a fluid level in the drainage water tank due to clogging of the drainage water tank can be sensed. When such rise of a fluid level is sensed, drainage water may stay in the heat exchanger without being discharged, which may result in failure. Therefore, for example, such measures as stopping the water heater can be taken.

Water heater 100 in the present embodiment is characterized in that a height difference H between sensing plane P2 in first chamber 81 and storage water plane P1 is greater than a height (for example, 100 mm) of a water head obtained by converting a difference (for example, 100 mmH2O) between atmospheric pressure and a minimum pressure at drainage water inlet 8a to the water head. Specifically, for example, when a difference between atmospheric pressure and a minimum pressure at drainage water inlet 8a is 100 mmH2O, a height of sensing plane P2 in first chamber 81 and storage water plane P1 should be set such that height difference H is greater than 100 mm. Thus, even when the fluid level in first chamber 81 is raised by a suction pressure of fan 6, the fluid level reaches only a position lower than sensing plane P2 and hence erroneous sensing by the sensing member sensing rise of a fluid level in the drainage water tank caused by clogging of the drainage water tank can be prevented. A minimum pressure at drainage water inlet 8a refers to a lowest pressure at drainage water inlet 8a during a whole period of operation and stop of the water heater, and for example, to a pressure at drainage water inlet 8a at the time when fan 6 is operated at maximum power.

An internal structure of drainage water tank 8 may be designed such that, with a minimum pressure in an exhaust path for combustion gas from the heat exchanger (secondary heat exchanger 4) to fan 6 (a minimum pressure on the upstream side of the fan) being defined as the reference, height difference H is greater than a height of a water head obtained by converting a difference between atmospheric pressure and the minimum pressure on the upstream side of the fan to the water head. The minimum pressure on the upstream side of the fan can be found, for example, by measuring a pressure at a portion of connection between fan 6 and exhaust box 5 (internal space 5ba in fan connection portion 5b) which is a position where a pressure is particularly low, in the exhaust path for combustion gas from the heat exchanger to fan 6 at the time when fan 6 is operated at maximum power. Since the minimum pressure at drainage water inlet 8a is unexceptionally higher than the minimum pressure in the exhaust path for combustion gas from the heat exchanger to fan 6, with such design, height difference H can sufficiently be greater than a height of a water head obtained by converting a difference between atmospheric pressure and the minimum pressure at the drainage water inlet to the water head. Thus, erroneous sensing by the sensing member can more reliably be prevented. Height difference H is preferably 1.2 to 1.5 time as great as a height of the water head obtained by converting a difference between atmospheric pressure and the minimum pressure on the upstream side of the fan to water head.

Figure 6:
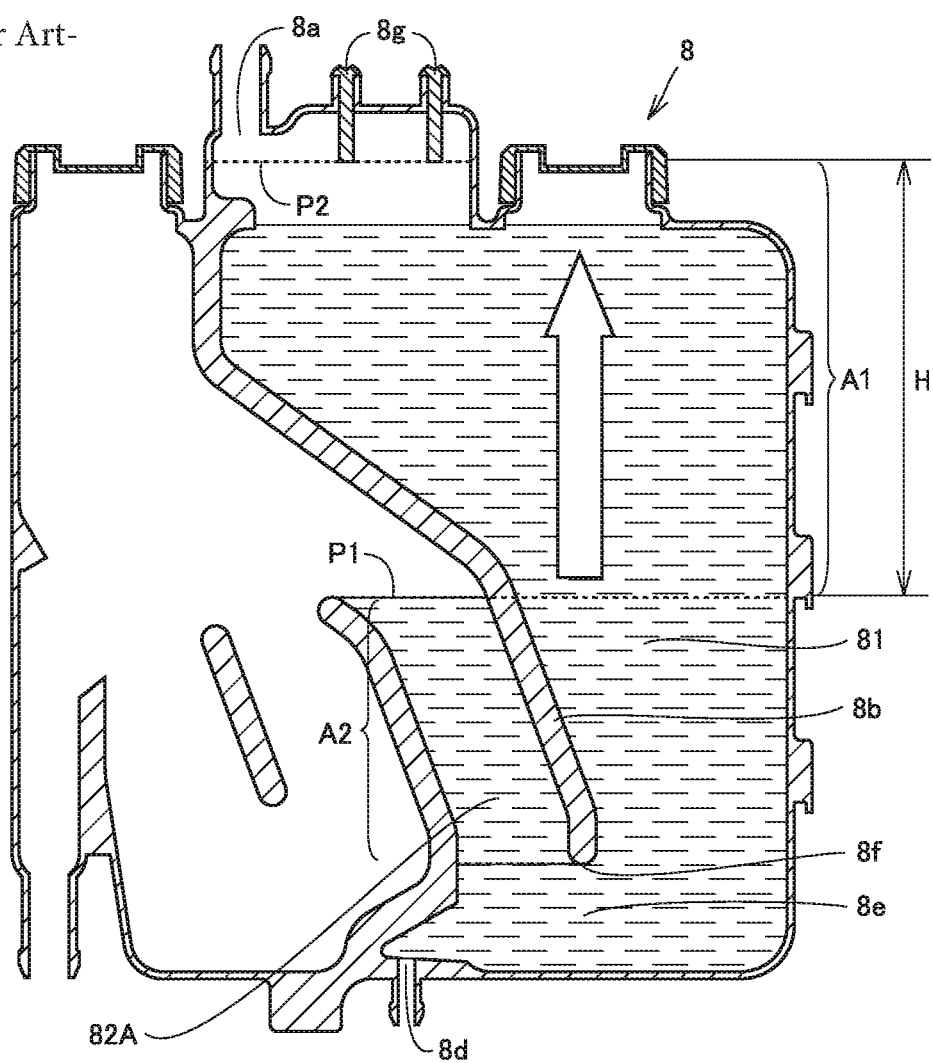
FIG. 6 is a cross-sectional view of a drainage water tank in a conventional water heater.

In a conventional water heater shown in FIG. 6, when a height difference (H) between sensing plane P2 in first chamber 81 and storage water plane P1 is smaller than a height of a water head obtained by converting a difference between atmospheric pressure and a minimum pressure at drainage water inlet 8a to the water head, a fluid level has been likely to reach sensing plane P2 due to rise of the fluid level in first chamber 81 in spite of absence of clogging of drainage water tank 8, and erroneous sensing by sensing member 8g has been likely. In contrast, the water heater in the present embodiment is designed such that a fluid level in first chamber 81 does not reach sensing plane P2 when drainage water tank 8 is not clogged. Therefore, erroneous sensing by sensing member 8g is suppressed. Thus, such a defective condition that the water heater is erroneously stopped due to erroneous sensing by the sensing member can be suppressed.

In water heater 100 in the present embodiment, preferably, a volume of a portion A2 from the height position of upper end 8f of hole 82e in second chamber 82 to storage water plane P1 is greater than a volume of a portion A1 from storage water plane P1 in first chamber 81 to sensing plane P2. More preferably, the volume of portion A2 is 1.5 to 5 times as great as the volume of portion A1. Thus, when a fluid level of drainage water is raised in first chamber 81 by a suction pressure of fan 6 at the time of resumption of operation of fan 6, the fluid level lowers in second chamber 82 more relatively gradually than in a case to the contrary (as in drainage water tank 8 in the conventional water heater shown in FIG. 6, the volume of the portion from the height position of upper end 8f of hole 82e in second chamber 82 to storage water plane P1 is smaller than the volume of the portion from storage water plane P1 in first chamber 81 to sensing plane P2). Therefore, lowering of the fluid level from the height position of upper end 8f of hole 82e and resultant loss of water seal of drainage water tank 8 can be suppressed.

In second chamber 82 in drainage water tank 8 in water heater 100 in the present embodiment, a cross-sectional area in the horizontal direction (for example, a cross-sectional area at a cross-section P4) of (a portion adjacent to the upper side of drainage water storage portion 82A of) an upper space 82B adjacent to the upper side of drainage water storage portion 82A is preferably greater than a cross-sectional area in the horizontal direction (for example, a cross-sectional area at a cross-section P3) of drainage water storage portion 82A. More preferably, the cross-sectional area in the horizontal direction of upper space 82B is 1.2 to 2 times as great as the cross-sectional area in the horizontal direction of drainage water storage portion 82A. Thus, when a fluid level of drainage water which has been raised in first chamber 81 by a suction pressure of fan 6 lowers to storage water plane P1 when the water heater (fan) is stopped, the fluid level is significantly less likely to rise from storage water plane P1 in second chamber 82 than in a case to the contrary (a cross-sectional area in the horizontal direction of upper space 82B is smaller than a cross-sectional area in the horizontal direction of drainage water storage portion 82). Therefore, such a defective condition that drainage water is abruptly discharged to the outside through drainage water discharge port 8c and scatters to the outside of the water heater can be suppressed.

An air vent 8h for allowing the internal space in first chamber 81 to communicate with atmosphere is provided in a top portion of second chamber 82. Air vent 8h communicates with the outside of water heater 100 through an air tube 8i (see FIG. 1). By thus providing air vent 8h, drainage water in second chamber 82 can smoothly be discharged through drainage water discharge port 8c. In a case that air vent 8h communicates with the inside of water heater 100, after drainage water tank 8 is water-sealed, dust or foreign matters may be suctioned into drainage water tank 8 through drainage water discharge port 8c due to a negative pressure in the water heater. As air vent 8h communicates with the outside of water heater 100 through air tube 8i, however, suction of dust or foreign matters through drainage water discharge port 8c can be suppressed.

Drainage water outlet port 8d (FIG. 3) is provided in a lower portion of drainage water tank 8. Drainage water drain piping 15 is connected to this drainage water outlet port 8d and leads to the outside of water heater 100 (FIG. 1). Drainage water drain piping 15 (which is normally closed) is designed such that drainage water in drainage water tank 8 which cannot be discharged through drainage water discharge piping 14 can be discharged by operating drainage water discharge piping 15 for maintenance or prevention of freezing. The internal space in drainage water tank 8 may be filled with a neutralizer (not shown) for neutralizing acid drainage water.

(Pipe)

Referring mainly to FIGS. 1 and 2, a water supply pipe 11 is connected to one end of heat conduction pipes 4b of secondary heat exchanger 4 and a hot water delivery pipe 12 is connected to one end of heat conduction pipe 3a of primary heat exchanger 3. The other end of heat conduction pipe 3a of primary heat exchanger 3 and the other end of heat conduction pipes 4b of secondary heat exchanger 4 are connected to each other through a connection pipe 13. Each of gas supply pipe 10, water supply pipe 11, and hot water delivery pipe 12 leads to the outside, for example, in a top portion of water heater 100. Burner 2, primary heat exchanger 3, secondary heat exchanger 4, exhaust box 5, fan 6, and drainage water tank 8 are arranged in housing 1.

Referring mainly to FIG. 1, gas supply pipe 10 is connected to burner 2. Water supply pipe 11 is connected to heat conduction pipes 4b (see FIG. 2) of secondary heat exchanger 4 and hot water delivery pipe 12 is connected to heat conduction pipe 3a (see FIG. 2) of primary heat exchanger 3. Heat conduction pipe 3a of primary heat exchanger 3 and heat conduction pipes 4b of secondary heat exchanger 4 are connected to each other through connection pipe 13. Each of gas supply pipe 10, water supply pipe 11, and hot water delivery pipe 12 leads to the outside, for example, in a top portion of water heater 100.

Although an embodiment of the present invention has been described, it should be understood that the embodiment disclosed herein is illustrative and non-restrictive in every respect. The scope of the present invention is defined by the terms of the claims, and is intended to include any modifications within the scope and meaning equivalent to the terms of the claims.

What is claimed is:

1. A water heater of a latent heat recovery type, capable of heating water by recovering latent heat of combustion gas, comprising:
    a burner generating combustion gas;
    a heat exchanger heating water which flows through an inside area of the heat exchanger via heat exchange with the combustion gas generated in the burner;
    a fan suctioning combustion gas which has passed through the heat exchanger and emitting combustion gas to an area outside of the water heater;
    a drainage water discharge path connected to the heat exchanger for discharging drainage water generated as a result of recovery of latent heat in the heat exchanger to an area outside of the heat exchanger,
    the drainage water discharge path including a drainage water tank, the drainage water tank having a first chamber provided with a drainage water inlet for allowing drainage water to flow in, and
a second chamber, partitioned by a partition from the first chamber, that communicates with the first chamber through a hole and is provided with a drainage water discharge port for discharging drainage water,
the drainage water discharge port leading to the area outside of the water heater,
the second chamber having a drainage water storage portion that stores drainage water which has flowed into the second chamber through the hole up to a storage water plane that is located at a position higher than an upper end of the hole,
the first chamber having a sensing member that extends down into the first chamber from a top portion of the first chamber to a sensing plane, the sensing plane being disposed at a height above the storage water plane, wherein
operation of the fan causes a pressure in the first chamber to become negative, and operating the fan at a maximum level causes a maximum magnitude of negative pressure to result in the first chamber,
a water head in the first chamber reaches a height above the storage water plane when the fan is operated at the maximum level, and
the height of the sensing plane is greater than the height of the water head.

2. The water heater according to claim 1, wherein
a volume of the second chamber from a height position of the upper end of the hole to the storage water plane is greater than a volume of the first chamber from the storage water plane to the sensing plane.

3. The water heater according to claim 2, wherein
the volume of the second chamber from the height position of the upper end of the hole to the storage water plane is 1.5 to 5 times as great as the volume of the first chamber from the storage water plane to the sensing plane.

4. The water heater according to claim 1, wherein
in the second chamber, a cross-sectional area in a horizontal direction of an upper space adjacent to an upper side of the drainage water storage portion is greater than a cross-sectional area in the horizontal direction of the drainage water storage portion.

5. The water heater according to claim 4, wherein
in the second chamber, the cross-sectional area in the horizontal direction of the upper space adjacent to the upper side of the drainage water storage portion is 1.2 to 2 times as great as the cross-sectional area in the horizontal direction of the drainage water storage portion.

6. The water heater according to claim 2, wherein
in the second chamber, a cross-sectional area in a horizontal direction of an upper space adjacent to an upper side of the drainage water storage portion is greater than a cross-sectional area in the horizontal direction of the drainage water storage portion.

7. The water heater according to claim 6, wherein
in the second chamber, the cross-sectional area in the horizontal direction of the upper space adjacent to the upper side of the drainage water storage portion is 1.2 to 2 times as great as the cross-sectional area in the horizontal direction of the drainage water storage portion.

8. The water heater according to claim 3, wherein
in the second chamber, a cross-sectional area in a horizontal direction of an upper space adjacent to an upper side of the drainage water storage portion is greater than a cross-sectional area in the horizontal direction of the drainage water storage portion.

9. The water heater according to claim 8, wherein
in the second chamber, the cross-sectional area in the horizontal direction of the upper space adjacent to the upper side of the drainage water storage portion is 1.2 to 2 times as great as the cross-sectional area in the horizontal direction of the drainage water storage portion.

10. The water heater according to claim 1, wherein
the second chamber has an air vent for communicating with atmosphere and the air vent communicates with the area outside of the water heater through an air tube.

11. The water heater according to claim 1, further comprising an air passage pipe communicating with an exhaust path for combustion gas from the heat exchanger to the fan and the drainage water discharge path from the heat exchanger to the drainage water tank.

* * * * *